(12) United States Patent
Gigante et al.

(10) Patent No.: US 10,140,152 B2
(45) Date of Patent: Nov. 27, 2018

(54) DYNAMIC TIMEOUT AS A SERVICE

(71) Applicant: VMware, Inc., Palo Alto, CA (US)

(72) Inventors: Scott Anthony Gigante, Cremorne (AU); Chao Li, Qingdao (CN)

(73) Assignee: VMware, Inc., Palo Alto, CA (US)

( * ) Notice: Subject to any disclaimer, the term of this patent is extended or adjusted under 35 U.S.C. 154(b) by 66 days.

(21) Appl. No.: 15/367,493

(22) Filed: Dec. 2, 2016

(65) Prior Publication Data

US 2018/0157528 A1 Jun. 7, 2018

(51) Int. Cl.
*G06F 9/46* (2006.01)
*G06F 9/48* (2006.01)
*G06F 9/50* (2006.01)
*G06N 7/00* (2006.01)

(52) U.S. Cl.
CPC .......... *G06F 9/4887* (2013.01); *G06F 9/5038* (2013.01); *G06N 7/005* (2013.01)

(58) Field of Classification Search
None
See application file for complete search history.

*Primary Examiner* — Gregory A Kessler
(74) *Attorney, Agent, or Firm* — Fish & Richardson P.C.

(57) ABSTRACT

Systems and techniques are described for determining timeouts for computer-executed processes. A described technique includes obtaining previous running times for a particular process. Each previous running time represents a duration for which the particular process was executed until the particular process completed or was terminated. A run time model for the particular process is generated based on the previous running times. The run time model for the particular process indicates, for each of a set of potential running times, a likelihood that the particular process will execute for a duration represented by the potential running time before completing. An initial timeout for the particular process is determined based on the run time model. The initial timeout is a specified duration instances of the particular process are allowed to execute before the particular process is automatically terminated. The initial timeout is set for an instance of the particular process.

20 Claims, 4 Drawing Sheets

DYNAMIC TIMEOUT AS A SERVICE

BACKGROUND

This document relates to determining timeout values for computer-executed processes.

Many automated processes executing on servers use a timeout to ensure that problems encountered during the execution do not unnecessarily consume the servers' resources. For example, a process that cannot complete due to a data source being unavailable may prevent a server's processor(s) from performing other processes. A timeout is a specified duration for which the particular process is allowed to execute before a particular event takes place, such as termination of the process. Once the process has executed for the specified amount of time, the process can be terminated and the resources consumed by the process can be released for use by other processes.

SUMMARY

In general, one aspect of the subject matter described in this document can be embodied in a technique that includes obtaining previous running times for a particular process, each previous running time representing a duration for which the particular process was executed until the particular process completed or was terminated; generating a run time model for the particular process based on the previous running times, the run time model for the particular process indicating, for each of a set of potential running times, a likelihood that the particular process will execute for a duration represented by the potential running time before completing; determining, based on the run time model, an initial timeout for the particular process, the initial timeout being a specified duration instances of the particular process are allowed to execute before the particular process is automatically terminated; and setting the initial timeout for an instance of the particular process.

These and other aspects can optionally include one or more of the following features. Some implementations include determining an adjusted timeout for the particular process based at least on the initial timeout and running times for each of one or more different processes that are different from the particular process and using the adjusted timeout to limit a duration for which a second instance of the particular process is executed before being automatically terminated.

In some implementations, determining the adjusted timeout includes identifying a particular context in which the particular process is being executed. The particular context can be based on one or more hardware components used to execute the particular process. One or more processes that have been executed in a context that has at least a threshold similarity to the particular context can be identified as the one or more different processes.

In some implementations, determining the adjusted timeout can include generating, for each of the one or more different processes, a long-term run time model by fitting a probability distribution to previous running times of the different process that occurred within a first time period. The long-term run time model can indicate, for each of a set of potential running times for the different process, a likelihood that the different process will execute for a duration represented by the potential running time before completing. For each of the one or more different processes, a short-term run time model can be generated by fitting a probability distribution to previous running times of the different process that occurred within a second time period. The short-term run time model can indicate, for each of a set of potential running times for the different process, a likelihood that the different process will execute for a duration represented by the potential running time before completing. The first time period can represent a longer period of time from a current time than the second time period. For each of the one or more different processes, a difference between the long-term model for the different process and the short-term model for the different process can be determined. The adjusted timeout can be determined by adjusting the initial timeout using each determined difference.

In some implementations, determining the adjusted timeout by adjusting the initial timeout using each determined difference can include determining, based on the determined difference, a context-specific proportionality constant. The adjusted timeout can be based on a product of the initial timeout and the context-specific proportionality constant.

In some implementations, determining the adjusted timeout can include identifying an actual timeout rate for one or more processes including the particular process. The actual timeout rate can represent a ratio between a number of times the one or more processes have timed out during a particular time period and a number of times the one or more processes been executed during the particular time period. A target timeout rate can be identified. A difference between the actual timeout rate and the target timeout rate can be determined. The initial timeout can be adjusted based on the difference between the actual timeout rate and the target timeout rate.

In some implementations, adjusting the initial timeout based on the difference between the actual timeout rate and the target timeout rate can include determining that the actual timeout rate is at least a threshold amount greater than the target timeout rate. An accuracy modifier can be increased by a specified amount in response to determining that the actual timeout rate is at least a threshold amount greater than the target timeout rate. The initial timeout can be increased using the accuracy modifier.

In some implementations, adjusting the initial timeout rate based on the difference between the actual timeout rate and the target timeout rate can include determining that the actual timeout rate is at least a threshold amount less than the target timeout rate, reducing an accuracy modifier by a specified amount in response to determining that the actual timeout rate is at least a threshold amount less than the target timeout rate, and reducing the initial timeout using the accuracy modifier.

Some implementations include determining that the instance of the particular process has been executing for the maximum duration specified by the initial timeout and automatically terminating the instance of the particular process. In some implementations, generating the run time model for the particular process based on the previous running times includes fitting a probability distribution to the previous running times.

Particular embodiments of the subject matter described in this document can be implemented so as to realize one or more of the following advantages. Timeouts for processes determined based on previous running times of the processes, with or without the described adjustments, can result in better process management than the use of static or arbitrary timeouts. For example, as the typical running time of the process is known, the timeout can be set such that the process does not run significantly longer than necessary and consume computing resources if the process is unlikely to be completed successfully. This can improve the performance of the computer executing the process and any other processes being executed by the computer by freeing up the resources for the other processes. In addition, using the previous running time data, the timeout can be set such that the process is not prematurely terminated before the process runs for a sufficient duration to complete successfully.

The details of one or more embodiments of the subject matter described in this document are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
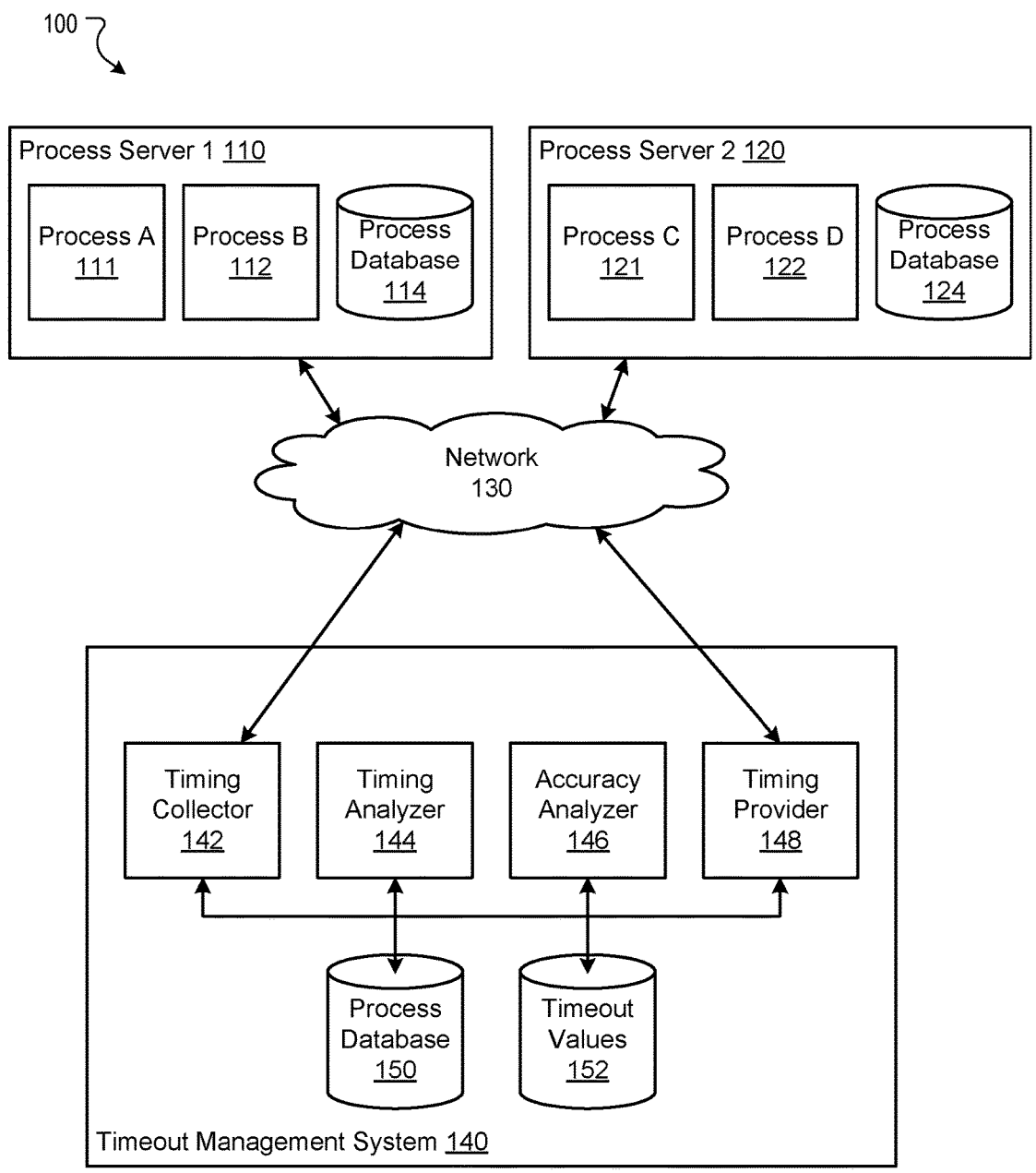
FIG. 1 shows an example environment in which a timeout management system determines timeouts for processes and uses the timeouts to prevent the processes from unnecessarily consuming computing resources while also not terminating prematurely.

This document generally describes techniques for determining a timeout for a computer-executed process and using the timeout to prevent the process from unnecessarily consuming computing resources while also not terminating a process prematurely. A timeout for a particular process is a specified duration that the particular process is allowed to execute before a particular event takes place, e.g., before the process is automatically terminated. Timeouts are useful for enabling a more efficient use of resources. Frequently, a process is expected to complete within some reasonable time period, such as ten seconds for example. In some cases, however, a process is unable to execute to completion and may "hang" or otherwise become inactive due to an error or for other reasons. In these situations, rather than waiting indefinitely for the process to complete, the computer will abort the waiting after the set timeout period has lapsed, thereby freeing up any resources utilized by that process. For example, the timeout may be ten seconds and the computer executing the process may automatically terminate the process in response to determining that the process has been executing for at least ten seconds. In general, a process is an instance of a program being executed by a computer. As used herein, the term "process" can also refer to sub-processes, routines, tasks, or other appropriate sequences of code executed by one or more computers.

A system can collect and store running times for a particular process, including the running times of the process when the process has timed out. A running time for a process is the duration for which the process executed before the process completed successfully or was terminated. The system can generate a run time model for the particular process based on the running times for the process. For example, the system can choose and fit a probability distribution to the running times of the particular process to generate a run time model for the process. The system can use this run time model to determine an initial timeout for the particular process. In some implementations, the run time model is a long-term model that is based on running times for the process over a particular time period, e.g., over the previous two weeks. The initial timeout can then be used to limit the duration that instances of the process can be executed before the process is automatically terminated.

The system can adjust the initial timeout for the particular process based on the running times of one or more other processes that have been executed in the same, or a similar context, as the particular process. For example, the context for a process may be based on hardware and/or software of a server on which the process is executed. In a particular example, two processes running in a same host computer or the same cluster of host computers may be considered as being executed in the same or a similar context. For processes that have been executed in the same or a similar context as the particular process, the system can generate a long-term run time model and a short-term run time model for the process. The long-term run time model may be generated for a process by fitting a probability distribution to running times of the process over a first time period, e.g., over the previous two weeks. The short-term run time model may be generated for a process by fitting a probability distribution to running times of the process over a second time period that is shorter than the first time period, e.g., over the previous day or hour. The system can determine a context-specific proportionality constant for the particular process based on the differences (e.g., proportionate differences) between the short-term run time model and values of the long-term run time model for each process that has been executed in the same or a similar context as the particular process. The system can then adjust the initial timeout for the particular process based on the context-specific proportionality constant, e.g., by multiplying the initial timeout by the context-specific proportionality constant.

To maintain at least a target percentage of successfully executed processes, the system can adjust the initial timeout for the particular process based on an accuracy modifier that is maintained by the system. The system may initially set the accuracy modifier to a specified value and update the accuracy modifier periodically based on an actual timeout rate for one or more processes, including the particular process. The actual timeout rate may be based on the number of times the one or more processes have timed out (e.g., have terminated in response to being executed for the duration specified by the process's timeout) and the number of times the one or more processes were executed over a period of time.

The system may compare the actual timeout rate to a target timeout rate for the one or more processes. If the actual timeout rate exceeds the target timeout rate by at least a threshold amount, the system may increase the accuracy modifier. Similarly, if the actual timeout rate is at least a threshold amount less than that target timeout rate, the system may reduce the accuracy modifier. If the actual timeout rate is within the threshold amount of the target timeout rate, the system may leave the accuracy modifier unchanged. The thresholds for determining whether to increase or decrease the accuracy modifier may be the same or different. The system can adjust the timeout for each of the one or more processes using the accuracy modifier. For example, the system may adjust the timeout for the particular process by multiplying the timeout for the particular process by the accuracy modifier.

By adjusting the timeout for a process based on the current context of the process, the timeout can account for slower or faster processing contexts. For example, if processes generally take longer to complete in certain contexts, the timeout can be increased to prevent the process from being prematurely terminated in that context. By adjusting the timeout based on a target timeout rate for processes for which the timeout is determined dynamically, the performance of the processes and the computer executing the processes can be managed at a target level. In addition, the system can use the adjustments to account for imperfections in determining timeouts for the processes.

FIG. 1 shows an example environment 100 in which a timeout management system 140 determines timeouts for processes and uses the timeouts to prevent the processes from unnecessarily consuming computing resources while also not terminating prematurely. The timeout management system 140 is an example of a system implemented as one or more computer programs on one or more computers in one or more physical locations.

The example environment 100 also includes process servers 110 and 120 that execute computer programs that can include processes. For example, the process server 110 executes processes 111 and 112, which may or may not be processes of different programs. Similarly, the process server 120 executes processes 121 and 122. Although each process server 110 and 120 is illustrated as executing two processes, the process servers 110 and 120 can each execute various numbers of processes simultaneously. In addition, the example environment 100 can include different numbers of process servers.

The process server 110 includes a process database 114 that stores running times for processes (e.g., the processes 111 and 112) executed by the process server 110. The running time for a process represents the duration for which the process was executed until the process completed successfully or was terminated. For example, a process that completed successfully twenty seconds after it started may have a running time of twenty seconds for that particular execution of the process. The process server 110 can monitor the running time for each process that is executed by the process server 110 and store the monitored running time in the process database 114 in association with the corresponding executed process.

The process server 110 may also monitor each process executed by the process server 110 to determine whether the process completed successfully or timed out. For each process, the process server 110 can maintain, in the process database 114, a count of the number of times the process was executed and the number of times the process timed out. The process server 110 can increment the count for the number of times the process timed out each time that the process server 110 determines that the process has been executing for a duration that meets the timeout for the process and, in response, terminates the process before the process has completed successfully. These two counts can be used to determine an actual timeout rate for the process at the process server 110. For example, the actual timeout rate may be equal to, or proportional to, the number of times the process timed out divided by the number of times the process was executed by the process server 110.

In some implementations, the process database 114 can also include a log for each process. The log can include, for each time the process was executed, the time at which the process executed, the running time for that execution, and data specifying whether the process completed successfully or timed out. In this way, the data can be filtered by time such that running times over a particular time period can be obtained or an actual timeout rate for a particular time period can be determined. The process server 120 includes a process database 124 that can store similar data for the processes executed by the process server 120 as the process database 114 stores for the processes executed by the process server 110.

The process servers 110 and 120 and the timeout management system 140 can transmit data over a network 130, e.g., a local area network (LAN), a wide area network (WAN), the Internet, a mobile network, or a combination thereof. For example, the process servers 110 and 120 may transmit data specifying running times of their respective processes, data specifying the number of times each process has been executed and/or timed out, and/or other appropriate data to a timing collector 142 of the timeout management system 140. The process servers 110 and 120 may transmit the data periodically or in response to requests received from the timing collector 142. The timing collector 142, which may be implemented using one or more computers, may store the data received from the process servers 110 and 120 in a process database 150.

A process can be executed on more than one process server. For example, two or more servers may execute instances of the same software program. In this example, the timing collector 142 may obtain the running times, data specifying the number of times the process was executed, and data specifying the number of times the process timed out from each process server that executed the process. The timing collector 142 may store the data in the process database 150 with a reference to the process server from which the data was obtained. In this way, the data can be filtered based on the process servers and server-specific calculations can be made.

The timeout management system 140 also includes a timing analyzer 144, an accuracy analyzer 146, and a timing provider 148. The timing analyzer 144 can generate run time models for processes based on previous running times of the processes. The run time model for a process can indicate, for each of a set of potential running times, a likelihood that the process will execute for a duration represented by the potential running time before the process completes. That is, the run time model for the process may indicate, for each of the set of potential running times, a likelihood that the process will have been executing for the potential running time as of the time of completion of the process and/or the likelihood that the process will need to execute for the potential running time before completion of the process.

The timing analyzer 144 can generate the run time model for the process by selecting and/or fitting the running times of the process to a probability distribution (e.g., a gamma distribution, a normal distribution, or another type of continuous probability distribution). For example, the timing analyzer 144 can select, from a set of probability distributions, a probability distribution that best matches the running times of the process. The timing analyzer 144 can then fit the running times of the process to a probability distribution using a distribution fitting technique. In some implementations, the timing analyzer 144 fits the running times of the process to a gamma distribution using the Nelder-Mead method to maximize the log-likelihood of estimation of parameters of the probability distribution.

In some implementations, the previous running times used to generate the run time model for a process may include only those that completed successfully. For example, running times for executions of the process that timed out may be filtered from the data used to generate the run time model. In some implementations, the previous running times used to generate the run time model for a process may include those that completed successfully and those that timed out. In this example, the running times for executions of the process that timed out may be extrapolated, e.g., based on historical running time data, to an estimated running time to successful completion.

The previous running times used to generate the run time model for a process may be the running times for executions of the process that occurred during a particular time period, e.g., those that occurred up to a week before the time at which the initial timeout is being determined. To obtain the running times, the timing analyzer 144 may query the process database 150 (or the process database of the process server(s) that executed the process) for the running time of each execution of the process that occurred within the particular time period.

The run time model for a process may be context-specific. For example, the timing analyzer 144 may generate a run time model for the process for a particular context based on the running times for the process when the process was executed in the particular context. The context for a process can be based on the hardware and/or software configuration of a server used to execute the process. For example, the context may be based on the type of processor(s), the speed of the processor(s), the amount of memory of the server, the type of memory, the operating system, the number of other processes being executed by the server, and/or other appropriate characteristics of the server that may affect the duration for which the process is executed.

The timing provider 148 can determine an initial timeout for a process using the run time model for the process. If the process is going to be executed in a particular context, the timing analyzer 144 may determine the initial timeout for the process using the context-specific run time model generated for the process and the particular context. To determine the initial timeout, the timing provider 148 can access the run time model and use the run time model to determine a duration for the process at which a specified proportion (e.g., 30%) of successful executions of the process would time out before being completed successfully. In this example, the timing provider 148 would select, as the initial timeout, the time value corresponding to the 70th percentile of the distribution represented by the run time model. The specified proportion may be based on the amount that would be acceptable for the process. For example, some processes may be more tolerant to premature terminations than other processes. As described below, the initial timeout can be adjusted to maintain a target percentage of executions that timeout.

The timing provider 148 can store the initial timeout for each process in a timeout values database 152. The timing provider 148 can also provide the initial timeout for the process to each process server that executes the process. The process server(s) can then use the timeout to limit the duration for which the process executes before being automatically terminated. If the initial timeout is context-specific, the timing provider 148 may provide the initial timeout to the process server(s) that have a context that matches the context for which the run time model was generated. If the process is executed in multiple different contexts, the timing provider 148 can determine an initial timeout for each context. For each context, the timing provider 148 can provide the initial timeout determined for that context to each process server that matches the context.

Figure 3:
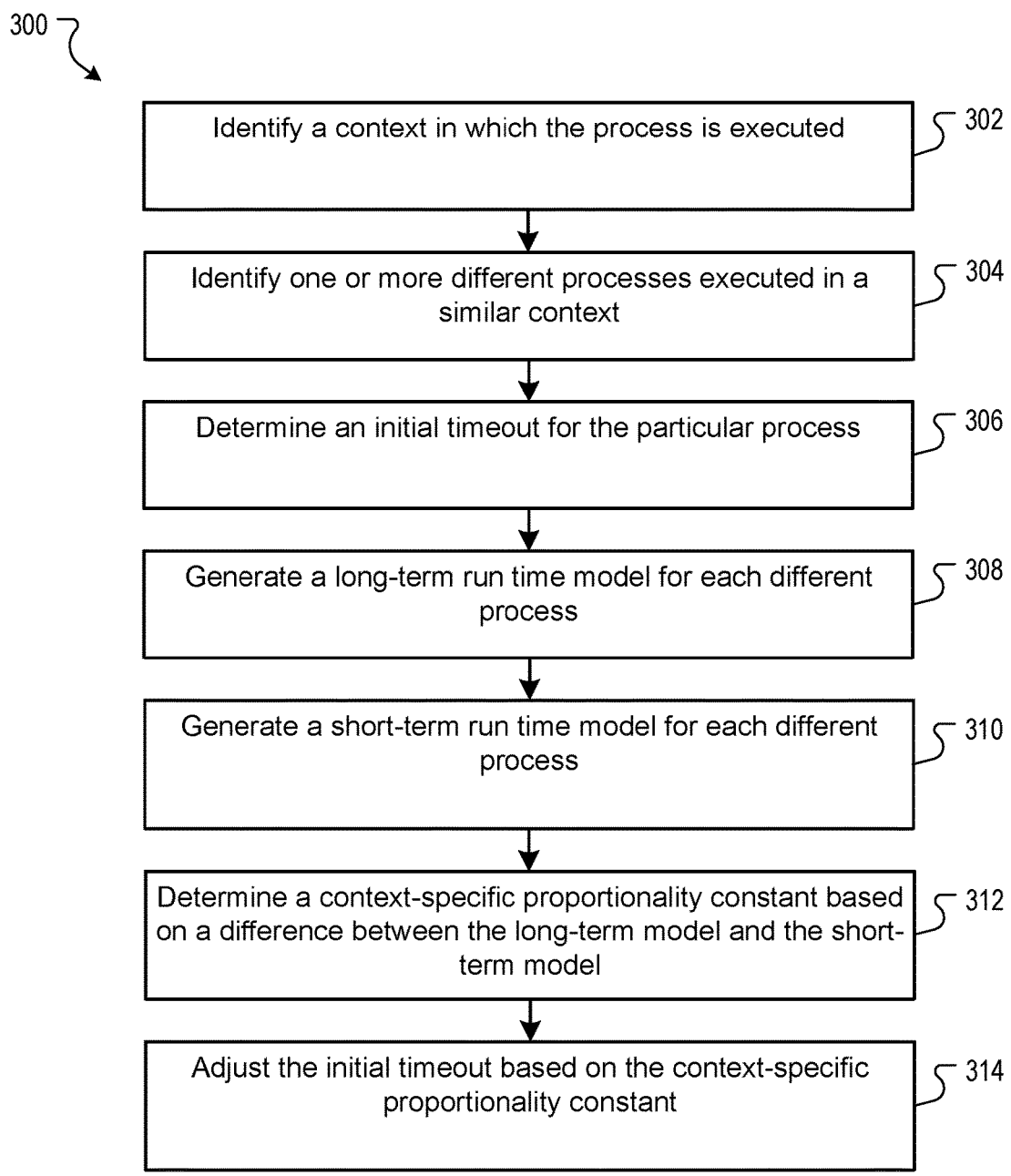
FIG. 3 is a flow chart of an example technique for adjusting a timeout for a particular process.

In some implementations, the initial timeout for each process can be adjusted before and/or after the initial timeout is put into use at the process servers. For example, the timing provider 148 may adjust the initial timeout for a particular process using one or more context-specific proportionality constants for the particular process. The timing analyzer 148 can determine the context-specific proportionality constant for the particular process based on the running times of other different processes that have been executed in a same or similar context as the particular process. The context-specific proportionality constant may also be based on the running times of the particular process in the particular context. An example technique for determining a context-specific proportionality constant for a process and using the context-specific proportionality constant to adjust the initial timeout for the process is illustrated in FIG. 3 and described in more detail below.

If the particular process is executed in multiple different contexts, the timing analyzer 148 can also determine a context-specific proportionality constant for each context based on the running times of other processes that have been executed in the same context or a similar context. The timing provider 148 can determine an adjusted timeout for each context by adjusting the initial timeout for the particular process in the context using the context-specific proportionality constant for the context. For example, the adjusted timeout for the particular process in a particular context may be equal to, or proportional to, the product of the initial timeout for the particular process and the context-specific proportionality constant for the particular context.

In some implementations, the accuracy analyzer 146 maintains an accuracy modifier for one or more processes. For example, the one or more processes may include each process for which the timeout management system 140 determines a timeout. The accuracy analyzer 146 may initially set the accuracy modifier to a default value, e.g., a value of one. The accuracy analyzer 146 may then periodically compare an actual timeout rate for the one or more processes to a target timeout rate for the one or more processes and adjust the accuracy modifier based on the comparison.

The actual timeout rate may be based on the number of times the one or more processes have timed out and the number of times the one or more processes were executed over a period of time. For example, the actual timeout rate may be equal to, or proportional to, the ratio between the number of times the one or more processes have timed out and the number of times the one or more processes were executed. A process is considered to have timed out when the process was automatically terminated in response to the process executing without completion for the duration specified by the timeout for the process. The target timeout rate can be set by a system designer and may represent a target percentage of executions of the one or more processes that should timeout if the one or more processes are being executed appropriately.

Figure 4:
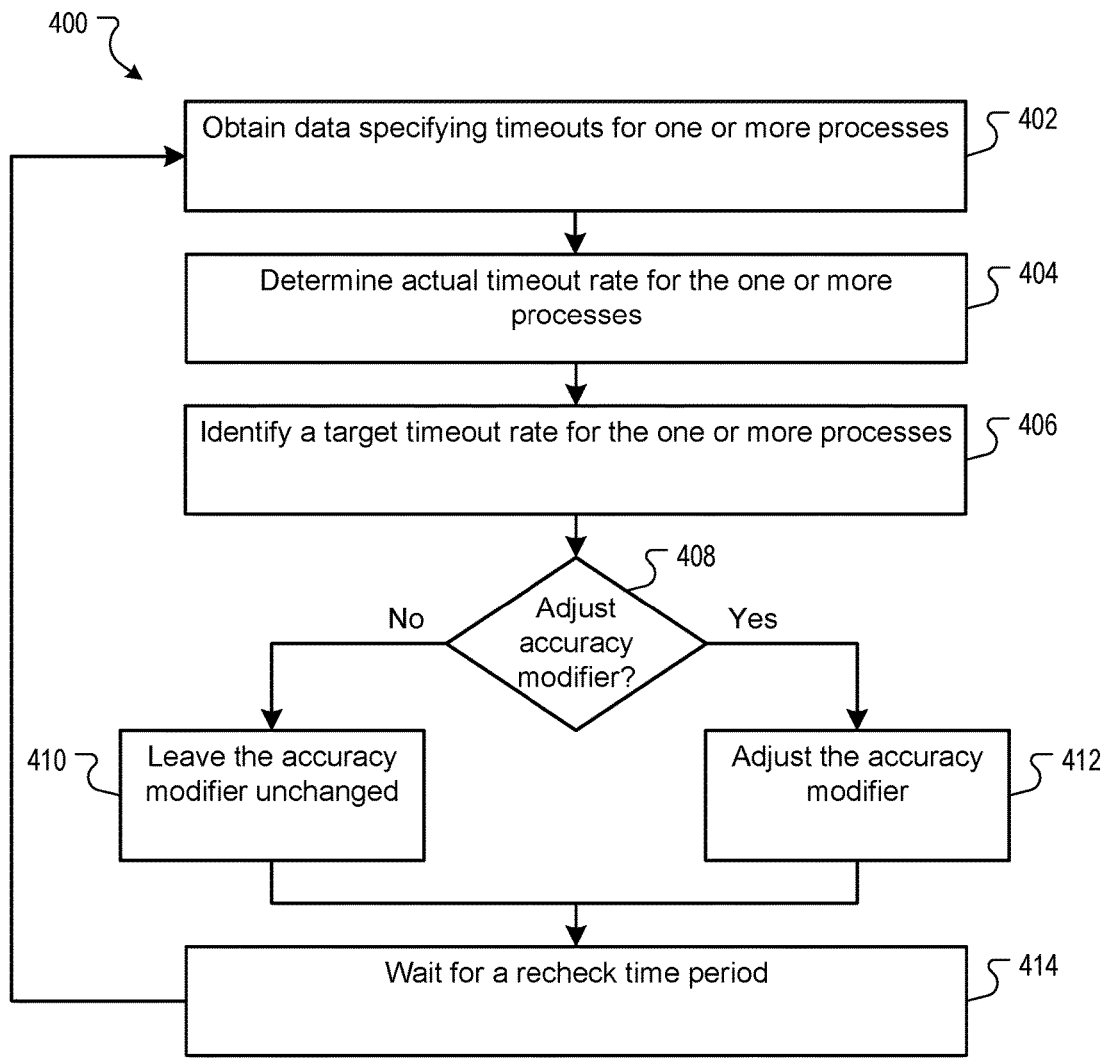
FIG. 4 is a flow chart of another example technique for adjusting a timeout for a particular process.

The accuracy analyzer 146 may periodically compare the actual timeout rate for the one or more processes to the target timeout rate. If the actual timeout rate is at least a threshold amount greater than the target timeout rate, the accuracy analyzer 146 may increase the accuracy modifier by a specified amount. For example, the accuracy analyzer 146 may increment the accuracy modifier by a value of 0.1. Similarly, if the actual timeout rate is at least a threshold amount less than the target timeout rate, the accuracy analyzer 146 may reduce the accuracy modifier. For example, the accuracy analyzer 146 may decrement the accuracy modifier by a value of 0.1. An example technique for adjusting the timeout for a process based on the actual timeout rate is illustrated in FIG. 4 and described below.

The timeout for a process can be based on the initial timeout for the process as determined using the run time model for the process, the context-specific proportionality constant for the process in the context in which the process is being executed, and the accuracy modifier for the one or more processes. For example, the timeout for a process may be equal to, or proportional to the multiplicative product of the initial timeout, the context-specific proportionality constant, and the accuracy modifier. If the process is executed in multiple different contexts, the timeout for the process in a particular context may be equal to, or proportional to, the multiplicative product of the initial timeout for the process in the particular context, the context-specific proportionality constant for the particular context, and the accuracy modifier.

Each of the initial timeout, the context-specific proportionality constant, and the accuracy modifier can be determined periodically based on respective time periods. Each time a value is determined, the timing provider 148 can determined an updated timeout for each process and provide the updated timeout for the process to each process server that executes the process. In turn, the process server(s) can use the timeout to limit the amount of time the process is executed before the process is automatically terminated. For example, if a particular process has been executing for the duration specified by the timeout for the particular process, the process server executing the particular process can automatically terminate the particular process.

Figure 2:
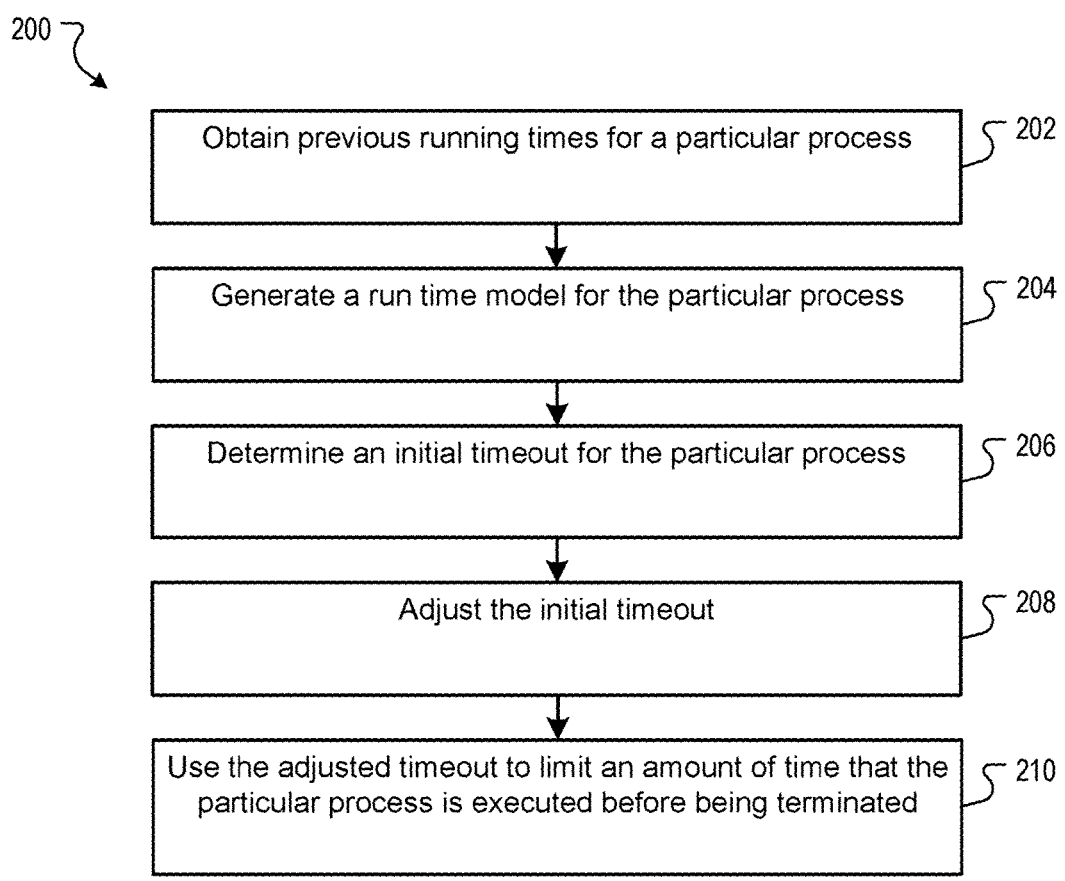
FIG. 2 is a flow chart of an example technique for determining a timeout for a particular process and using the timeout to limit an amount of time that the particular process is executed before being terminated.

FIG. 2 is a flow chart of an example technique 200 for determining a timeout for a particular process and using the timeout to limit an amount of time that the particular process is executed before being terminated. The example technique 200 is performed by a system of one or more computers. For example, the technique 200 may be performed by the timeout management system 140 of FIG. 1.

The system obtains previous running times for the particular process (202). A running time for a process is the duration for which the process executed until the process completed successfully or was terminated. The system can obtain the previous running times for the particular process that have occurred during a particular time period. For example, the system may obtain the previous running times for executions of the particular process that occurred during the previous day.

The system generates a run time model for the particular process using the obtained running times (204). The run time model can indicate, for each of a set of potential running times, a likelihood that the particular process will execute for a duration represented by the potential running time before the process completes. The system can generate the run time model for the particular process by selecting and fitting a continuous probability distribution (e.g., a gamma distribution or normal distribution) to the running times of the particular process. For example, the system can select, from a set of probability distributions, a probability distribution that best matches the running times of the particular process. The system can then fit the selected probability distribution to the running times of the particular process.

The system determines in initial timeout for the particular process (206). To determine the initial timeout, the system can access the run time model and use the run time model to determine a duration for the particular process at which a specified proportion of successful executions of the particular process would time out before being completed successfully. The specified proportion may be based on the amount that would be acceptable for the particular process.

The system adjusts the initial timeout for the particular process (208). The system can adjust the initial timeout for the particular process using a context-specific proportionality constant for a context in which the particular process is executing or will be executing. As example technique for adjusting a timeout using a context-specific proportionality constant is illustrated in FIG. 3 and described below. In addition, or in the alternative, the system can adjust the initial timeout for the particular process using an accuracy modifier. An example technique for adjusting a timeout using an accuracy modifier is illustrated in FIG. 4 and described below. The system may adjust the initial timeout for the particular process by multiplying the initial timeout by the context-specific proportionality constant and/or the accuracy modifier.

The system uses the adjusted timeout to limit an amount of time that the particular process is executed before being automatically terminated (210). For example, the system may provide the adjusted timeout to each server that executes the particular process. The server may then monitor the duration for which the particular process executes each time that the particular process is executed. If the duration meets the duration specified by the adjusted timeout, the server automatically terminates the particular process so that the particular process does not unnecessarily consume the server's resources.

FIG. 3 is a flow chart of an example technique 300 for adjusting a timeout for a particular process. The example technique 300 is performed by a system of one or more computers. For example, the technique 300 may be performed by the timeout management system 140 of FIG. 1.

The system identifies a context in which the particular process is executed (302). The context for the particular process can be based on the hardware and/or software of a server used to execute the process. For example, as described above, the context may be based on the type of processor(s), the speed of the processor(s), the amount of memory of the server, the type of memory, the operating system, the number of other processes being executed by the server, and/or other appropriate characteristics of the server that may affect the duration the process is executed.

The system identifies one or more different processes that have been executed in a same or similar context as the particular process (304). A context of a process may be similar to the context of the particular process if the hardware and/or software of the process's context has at least a threshold similarity to the context of the particular process. The similarity between two contexts may be based on the similarity in performance or capabilities of each of a set of hardware components, e.g., the similarity in performance of the processors used to execute the processes, the similarity in the amount of memory available to the processors, and so on. For example, two processes that execute on the same physical server, use the same physical network connection, and/or use a mutually dependent sub-process may be considered to have a similar context as the processes share the same factors that may limit their performance.

The system determines an initial timeout for the particular process (306). For example, the system may generate a run time model for the particular process using running times of the particular process over a particular time period and determine the initial timeout based on the run time model, as described above with reference to FIG. 2.

The system generates a long-term run time model for each of the one or more different processes that have been executed in a same or similar context as the particular process (308). For each different process, the system may obtain running times for executions of the different process that occurred during a first time period and generate the long-term run time model by selecting and fitting a probability distribution to the running times. In some implementations, the first time period is the same as the particular time period used to generate the run time model for the particular process. The long-term model for a different process can indicate, for each of a set of potential running times for the different process, a likelihood that the different process will execute for a duration represented by the potential running time before completing.

The system generates a short-term run time model for each of the one or more different processes that have been executed in a same or similar context as the particular process (310). For each different process, the system may obtain running times for executions of the different process that occurred during a second time period and generate the short-term run time model by selecting and fitting a probability distribution to the running times. The second time period may have a shorter duration than the first time period. For example, the first time period may be the previous day or week, while the second time period may be the previous hour. The long-term model for a different process can indicate, for each of a set of potential running times for the different process, a likelihood that the different process will execute for a duration represented by the potential running time before completing.

The system determines, based on each determined difference, a context-specific proportionality constant for the context in which the particular process is executed (312). In some implementations, the system may determine the context-specific proportionality constant based on differences between the long-term model and the short-term model for each of the different processes. For example, the system may determine the context-specific proportionality constant based on a function of distribution parameters for the models. The distribution parameters can include shape and scale of the models, the empirical and/or theoretical mean of the values in each model, variance between long-term and short-term models of each of the different processes, and/or particular percentiles of interest for the models. For example, the context-specific proportionality constant may be based on a function of differences between the shape and scale of the long-term model and the short-term model for each of the different processes.

The system adjusts the initial timeout for the particular process using the context-specific proportionality constant (314). For example, the system may generate an adjusted timeout for the particular process by determining a product of the initial timeout and the context-specific proportionality constant.

In some implementations, rather than identify the context for a process and determine the context-specific proportionality constant for the process based on the running times of other processes that have the same or a similar context as the process, the system may identify a particular context. For the particular context, the system may use the running times of each individual process that executes in the particular context to determine the context-specific proportionality constant for the context. The system may also determine, for each process that executes in the particular context, an initial timeout for the process based on a run time model for the process. The system can then determine an adjusted timeout for each process using the time out for the process and the context-specific proportionality constant for the particular context.

FIG. 4 is a flow chart of another example technique 400 for adjusting a timeout for a particular process. The example technique 400 is performed by a system of one or more computers. For example, the technique 400 may be performed by the timeout management system 140 of FIG. 1.

The system obtains data specifying timeouts for one or more processes (402). The one or more processes can include the particular process and any other processes for which the system determines a timeout. The data can specify the number of times the one or more processes have timed out during a particular time period (e.g., the previous hour) and the number of times the one or more processes were executed during the particular time period.

The system determines an actual timeout rate for the one or more processes (404). The actual timeout rate may be equal to, or proportionate to, the ratio between the number of times the one or more processes have timed out during the particular time period and the number of times the one or more processes were executed during the particular time period.

The system identifies a target timeout rate for the one or more processes (406). For example, the target timeout rate can be set by a system designer and may represent a target percentage of executions of the one or more processes that should timeout if the one or more processes are being executed appropriately.

The system determines whether to adjust an accuracy modifier for the one or more processes (408). For example, the system may determine to increase the accuracy modifier when the actual timeout is at least a threshold amount greater than the target timeout rate. Similarly, the system may determine to reduce the accuracy modifier when the actual timeout rate is at least a threshold amount less than the target timeout rate. If the actual timeout rate is within a threshold amount of the target timeout rate, the system may determine to not change the accuracy modifier.

If the system determines to not adjust the accuracy modifier, the system leaves the accuracy modifier unchanged (410). If the system determines to adjust (e.g., either increase or reduce) the accuracy modifier, the system may make the adjustment to the accuracy modifier and update the timeout(s) for the one or more processes (412). For example, if the system determined to increase the accuracy modifier, the system may increment the accuracy modifier by a specified amount. Similarly, if the system determined to reduce the accuracy modifier, the system may decrement the accuracy modifier by a specified amount.

Based on the adjusted accuracy modifier, the system may adjust the timeout for the particular process and each other process of the one or more processes, if any. For example, the system may use, for the particular process, a timeout that is based on an initial timeout for the particular process, a context-specific proportionality constant for the context in which the particular process is executed, and the accuracy modifier. When the accuracy modifier is adjusted, the system can recalculate the timeout for the particular process using the updated accuracy modifier.

After adjusting the accuracy modifier or leaving the accuracy modifier, the system waits for a recheck time period to elapse (414). After the recheck time period elapses, the system returns to operation 402 to obtain updated timeout data and determine whether to adjust the accuracy modifier based on the updated timeout data. The technique 400 can be repeated continuously to manage the performance of the one or more processes.

Embodiments of the subject matter and the operations described in this document can be implemented in digital electronic circuitry, or in computer software, firmware, or hardware, including the structures disclosed in this document and their structural equivalents, or in combinations of one or more of them. Embodiments of the subject matter described in this document can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this document can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this document can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this document can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this document, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by a data processing apparatus, the method comprising:
   obtaining previous running times for a particular process, each previous running time representing a duration for which the particular process was executed until the particular process completed or was terminated;
   generating a run time model for the particular process based on the previous running times, the run time model for the particular process indicating, for each of a set of potential running times, a likelihood that the particular process will execute for a duration represented by the potential running time before completing;
   determining, based on the run time model, an initial timeout for the particular process, the initial timeout being a specified duration instances of the particular process are allowed to execute before the particular process is automatically terminated; and
   setting the initial timeout for an instance of the particular process.

2. The method of claim 1, further comprising:
   determining an adjusted timeout for the particular process based at least on the initial timeout and running times for each of one or more different processes that are different from the particular process; and
   using the adjusted timeout to limit a duration for which a second instance of the particular process is executed before being automatically terminated.

3. The method of claim 2, wherein determining the adjusted timeout comprises:
   identifying a particular context in which the particular process is being executed, the particular context being based on one or more hardware components used to execute the particular process; and
   identifying, as the one or more different processes, one or more processes that have been executed in a context that has at least a threshold similarity to the particular context.

4. The method of claim 3, wherein determining the adjusted timeout comprises:
   generating, for each of the one or more different processes, a long-term run time model by fitting a probability distribution to previous running times of the different process that occurred within a first time period, the long-term run time model indicating, for each of a set of potential running times for the different process, a likelihood that the different process will execute for a duration represented by the potential running time before completing;
   generating, for each of the one or more different processes, a short-term run time model by fitting a probability distribution to previous running times of the different process that occurred within a second time period, the short-term run time model indicating, for each of a set of potential running times for the different process, a likelihood that the different process will execute for a duration represented by the potential running time before completing, wherein the first time period represents a longer period of time from a current time than the second time period;
   determining, for each of the one or more different processes, a difference between the long-term model for the different process and the short-term model for the different process; and
   determining the adjusted timeout by adjusting the initial timeout using each determined difference.

5. The method of claim 4, wherein determining the adjusted timeout by adjusting the initial timeout using each determined difference comprises determining, based on the determined difference, a context-specific proportionality constant, wherein the adjusted timeout is based on a product of the initial timeout and the context-specific proportionality constant.

6. The method of claim 2, wherein determining the adjusted timeout comprises:
   identifying an actual timeout rate for one or more processes including the particular process, the actual timeout rate representing a ratio between a number of times the one or more processes have timed out during a particular time period and a number of times the one or more processes were executed during the particular time period;

identifying a target timeout rate;

determining a difference between the actual timeout rate and the target timeout rate; and adjusting the initial timeout based on the difference between the actual timeout rate and the target timeout rate.

7. The method of claim 6, wherein adjusting the initial timeout based on the difference between the actual timeout rate and the target timeout rate comprises:

determining that the actual timeout rate is at least a threshold amount greater than the target timeout rate;

increasing an accuracy modifier by a specified amount in response to determining that the actual timeout rate is at least a threshold amount greater than the target timeout rate; and increasing the initial timeout using the accuracy modifier.

8. The method of claim 6, wherein adjusting the initial timeout rate based on the difference between the actual timeout rate and the target timeout rate comprises:

determining that the actual timeout rate is at least a threshold amount less than the target timeout rate;

reducing an accuracy modifier by a specified amount in response to determining that the actual timeout rate is at least a threshold amount less than the target timeout rate; and reducing the initial timeout using the accuracy modifier.

9. The method of claim 1, further comprising:

determining that the instance of the particular process has been executing for the maximum duration specified by the initial timeout; and automatically terminating, by the data processing apparatus, the instance of the particular process.

10. The method of claim 1, wherein generating the run time model for the particular process based on the previous running times comprises fitting a probability distribution to the previous running times.

11. A system comprising:

a data processing apparatus; and a memory storage apparatus in data communication with the data processing apparatus and storing instructions executable by the data processing apparatus that when executed by the data processing apparatus cause the data processing apparatus to perform operations comprising:

obtaining previous running times for a particular process, each previous running time representing a duration for which the particular process was executed until the particular process completed or was terminated;

generating a run time model for the particular process based on the previous running times, the run time model for the particular process indicating, for each of a set of potential running times, a likelihood that the particular process will execute for a duration represented by the potential running time before completing;

determining, based on the run time model, an initial timeout for the particular process; and using the initial timeout to limit a duration for which an instance of the particular process is executed before being automatically terminated.

12. The system of claim 11, wherein the operations further comprise:

determining an adjusted timeout for the particular process based at least on the initial timeout and running times for each of one or more different processes that are different from the particular process; and using the adjusted timeout to limit a duration for which a second instance of the particular process is executed before being automatically terminated.

13. The system of claim 12, wherein determining the adjusted timeout comprises:

identifying a particular context in which the particular process is being executed, the particular context being based on one or more hardware components used to execute the particular process; and identifying, as the one or more different processes, one or more processes that have been executed in a context that has at least a threshold similarity to the particular context.

14. The system of claim 13, wherein determining the adjusted timeout comprises:

generating, for each of the one or more different processes, a long-term run time model by fitting a probability distribution to previous running times of the different process that occurred within a first time period, the long-term run time model indicating, for each of a set of potential running times for the different process, a likelihood that the different process will execute for a duration represented by the potential running time before completing;

generating, for each of the one or more different processes, a short-term run time model by fitting a probability distribution to previous running times of the different process that occurred within a second time period, the short-term run time model indicating, for each of a set of potential running times for the different process, a likelihood that the different process will execute for a duration represented by the potential running time before completing, wherein the first time period represents a longer period of time from a current time than the second time period;

determining, for each of the one or more different processes, a difference between the long-term model for the different process and the short-term model for the different process; and determining the adjusted timeout by adjusting the initial timeout using each determined difference.

15. The system of claim 14, wherein determining the adjusted timeout by adjusting the initial timeout using each determined difference comprises determining, based on the determined difference, a context-specific proportionality constant, wherein the adjusted timeout is based on a product of the initial timeout and the context-specific proportionality constant.

16. The system of claim 12, wherein determining the adjusted timeout comprises:

identifying an actual timeout rate for one or more processes including the particular process, the actual timeout rate representing a ratio between a number of times the one or more processes have timed out during a particular time period and a number of times the one or more processes were executed during the particular time period;

identifying a target timeout rate;

determining a difference between the actual timeout rate and the target timeout rate; and adjusting the initial timeout based on the difference between the actual timeout rate and the target timeout rate.

17. The system of claim 16, wherein adjusting the initial timeout based on the difference between the actual timeout rate and the target timeout rate comprises:
  determining that the actual timeout rate is at least a threshold amount greater than the target timeout rate;
  increasing an accuracy modifier by a specified amount in response to determining that the actual timeout rate is at least a threshold amount greater than the target timeout rate; and
  increasing the initial timeout using the accuracy modifier.

18. The system of claim 16, wherein adjusting the initial timeout based on the difference between the actual timeout rate and the target timeout rate comprises:
  determining that the actual timeout rate is at least a threshold amount less than the target timeout rate;
  reducing an accuracy modifier by a specified amount in response to determining that the actual timeout rate is at least a threshold amount less than the target timeout rate; and
  reducing the initial timeout using the accuracy modifier.

19. The system of claim 11, wherein the operations further comprise:
  determining that the instance of the particular process has been executing for the maximum duration specified by the initial timeout; and
  automatically terminating, by the data processing apparatus, the instance of the particular process.

20. A non-transitory computer storage medium encoded with a computer program, the program comprising instructions that when executed by data processing apparatus cause the data processing apparatus to perform operations comprising:
  obtaining previous running times for a particular process, each previous running time representing a duration for which the particular process was executed until the particular process completed or was terminated;
  generating a run time model for the particular process based on the previous running times, the run time model for the particular process indicating, for each of a set of potential running times, a likelihood that the particular process will execute for a duration represented by the potential running time before completing;
  determining, based on the run time model, an initial timeout for the particular process, the initial timeout being a specified duration instances of the particular process are allowed to execute before the particular process is automatically terminated; and
  setting the initial timeout for an instance of the particular process.

* * * * *